United States Patent
Rilbe

(10) Patent No.: US 6,743,137 B2
(45) Date of Patent: Jun. 1, 2004

(54) ECCENTRIC GEAR

(75) Inventor: Ulf Rilbe, Vasteras (SE)

(73) Assignee: Scandrive Control AB, Kolback (SE)

( * ) Notice: Subject to any disclaimer, the term of this patent is extended or adjusted under 35 U.S.C. 154(b) by 0 days.

(21) Appl. No.: 10/204,216

(22) PCT Filed: Jan. 24, 2001

(86) PCT No.: PCT/SE01/00118
§ 371 (c)(1),
(2), (4) Date: Aug. 19, 2002

(87) PCT Pub. No.: WO01/63147
PCT Pub. Date: Aug. 30, 2001

(65) Prior Publication Data
US 2003/0022750 A1 Jan. 30, 2003

(30) Foreign Application Priority Data
Feb. 22, 2000 (SE) .............................................. 0000571

(51) Int. Cl.⁷ .............................................. F16H 23/00
(52) U.S. Cl. ...................................... 475/163; 475/176
(58) Field of Search ................................. 475/176, 163

(56) References Cited

U.S. PATENT DOCUMENTS

| 2,250,259 | A | * | 7/1941 | Foote, Jr. ..................... 475/176 |
|---|---|---|---|---|
| 2,908,191 | A | * | 10/1959 | Sundt ......................... 475/176 |
| 4,023,441 | A | * | 5/1977 | Osterwalder ................. 475/176 |
| 4,452,102 | A | * | 6/1984 | Shaffer ....................... 475/176 |
| 4,946,428 | A | * | 8/1990 | Barozzi ....................... 475/176 |
| 5,269,202 | A | | 12/1993 | Kiyosawa et al. |

FOREIGN PATENT DOCUMENTS

| WO | 88 05508 | 7/1988 |
|---|---|---|
| WO | 96 17187 | 6/1996 |
| WO | 97 26467 | 7/1997 |

* cited by examiner

Primary Examiner—Dirk Wright
(74) Attorney, Agent, or Firm—Young & Thompson

(57) ABSTRACT

An eccentric gear for providing a speed difference between two machine elements which are rotatably journalled in relation to a reference member and individually rotatable around a symmetry axis. The gear includes two pairs of co-operating gear rims, one of which in each pair is eccentric in relation to the axis and one of which is in the form of a male gear rim with out-turned teeth, and the other one is a female gear rim with in-turned teeth. One of the gear rims in each pair is rigidly connected to a homologous gear rim in the other pair of gear rims and situated along a common axis that is eccentric and oblique in relation to the axis while the other gear rims are rotatable in relation to each other.

19 Claims, 4 Drawing Sheets

ECCENTRIC GEAR

TECHNICAL OF THE INVENTION

Figure 1:
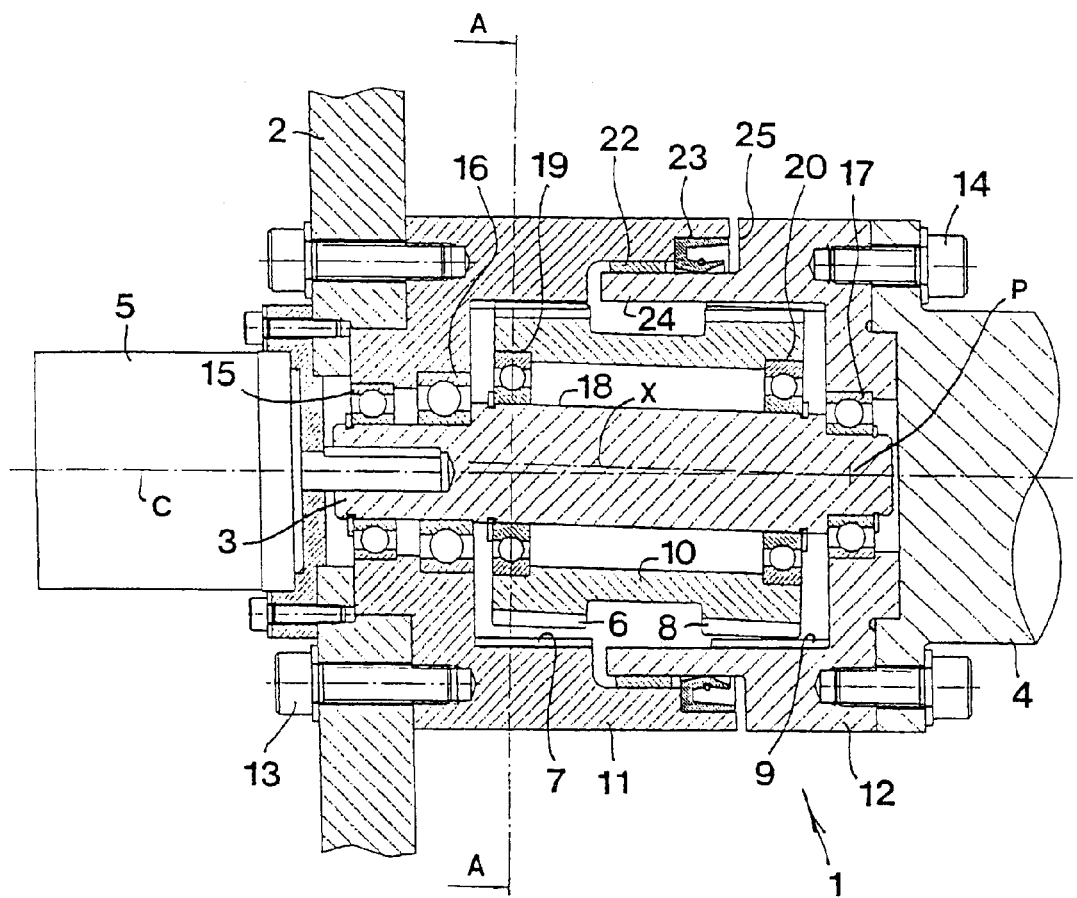

This invention relates to an eccentric gear for providing a speed difference between two machine elements which are rotatably mounted in relation to a reference member and individually rotatable around a common geometrical symmetry axis, including a pair of co-operating gear rims, one of which is eccentric in relation to the symmetry axis and one of which is in the form of a male-like gear rim formed with out-turned teeth, and the other one is in the form of a female-like gear rim which is formed with in-turned teeth and has a larger diameter than the male gear rim in order to enable engagement of only one or a few of the teeth of the male gear rim in the female gear rim, one of the gear rims being arranged to roll off against the other one.

Prior Art

In comparison to planetary gears, eccentric gears have a plurality of fundamental advantages. Eccentric gears enable, above all, a high gear change in one single step, at the same time as the same have servo-technically favourable properties, such as limited play, large torsional stiffness as well as a low moment of inertia of the input shaft of the gear. Different forms of eccentric gears are previously known, e.g. by EP 345 276 (SE 8700291-1) and U.S. Pat. No. 5,269,202 (marketed under the trademark HARMONIC DRIVE). Other eccentric gears are commercially available under the trademark CYCLO DRIVE. These previously known constructions generally enable gear changes within the range of approx. 10:1 to approx 250:1.

The previously known reduction gears of the eccentric type are, however, also associated with problems and shortcomings. Among other things, a large number of teeth on the male and female gear rims of the gear is required at high gear changes, which entails that the teeth compulsorily become small; something which limits the performance of the gears and increases the manufacturing difficulties. As an example, it should be mentioned that gears of the type HARMONIC DRIVE require approx 500 teeth for the gear change of 250:1, while other constructions may be formed with fewer teeth, e.g. down to approx. 250 teeth. Another problem, common for a plurality of the previously known eccentric gears, is the so-called "transmitter"-function, i.e. the need for particular means to eliminate the eccentric motion between the eccentrically working gear rim and the output shaft of the gear. Proposals for solutions of this problem are found, for instance, in the following patents: EP 594 549 (SE 9203101-2) and EP 791 147 (SE 9404154-8). Strength problems, friction losses and angle plays increasing with time do, however, characterize the constructions according to the last-mentioned patents, the means for eliminating the eccentric motion between the gear rim and the output shaft tending to limit the performance of the gears within given outer dimensions. Furthermore, these means account for a considerable part of the total manufacturing cost of the gears.

OBJECTS AND FEATURES OF THE INVENTION

The present invention aims at obviating the above-mentioned shortcomings of previously known eccentric gears and at providing an improved eccentric gear. Therefore, a primary object of the invention is to provide an eccentric gear which with few, simple components can bring about very high gear changes while using a comparatively limited number of teeth in the co-operating gear rims. A further object is to provide an eccentric gear, the gear change of which may, in a simple and flexible way, be chosen within a wide spectrum of gear changes, all from very moderate gear changes (e.g. the magnitude of 10:1) to extremely high gear changes (the magnitude of 30 000:1 or more). By constructive simplicity, the gear should, further-more, be possible to manufacture in an effective way production-wise and at low costs.

According to the invention, at least the primary object is attained by the features defined in the characterizing clause of claim 1. Preferred embodiments of the eccentric gear according to the invention are furthermore defined in the dependent claims.

BRIEF DESCRIPTION OF THE APPENDED DRAWINGS

Figure 2:
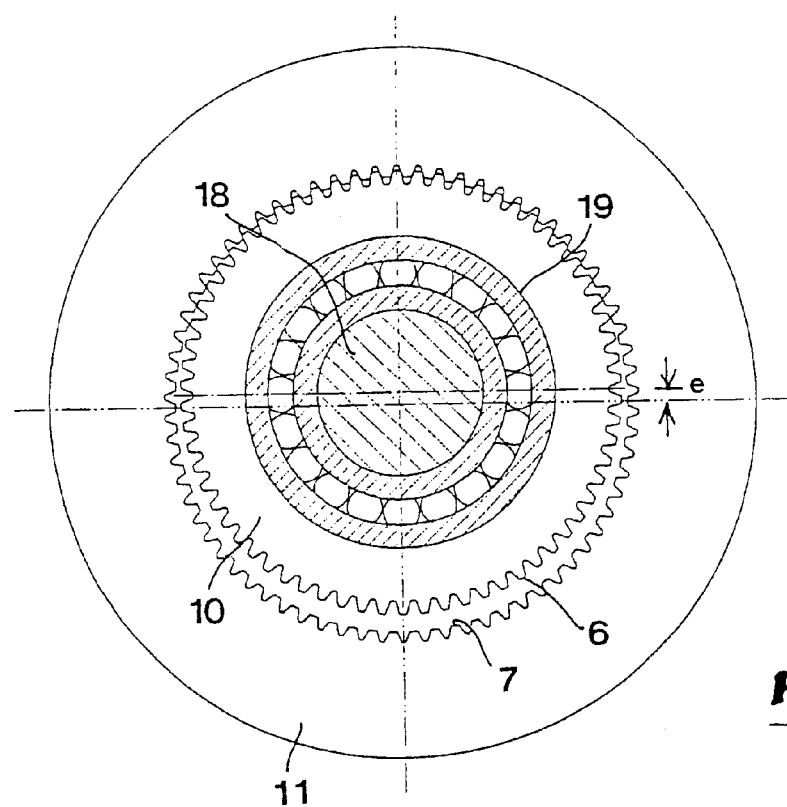
Figure 3:
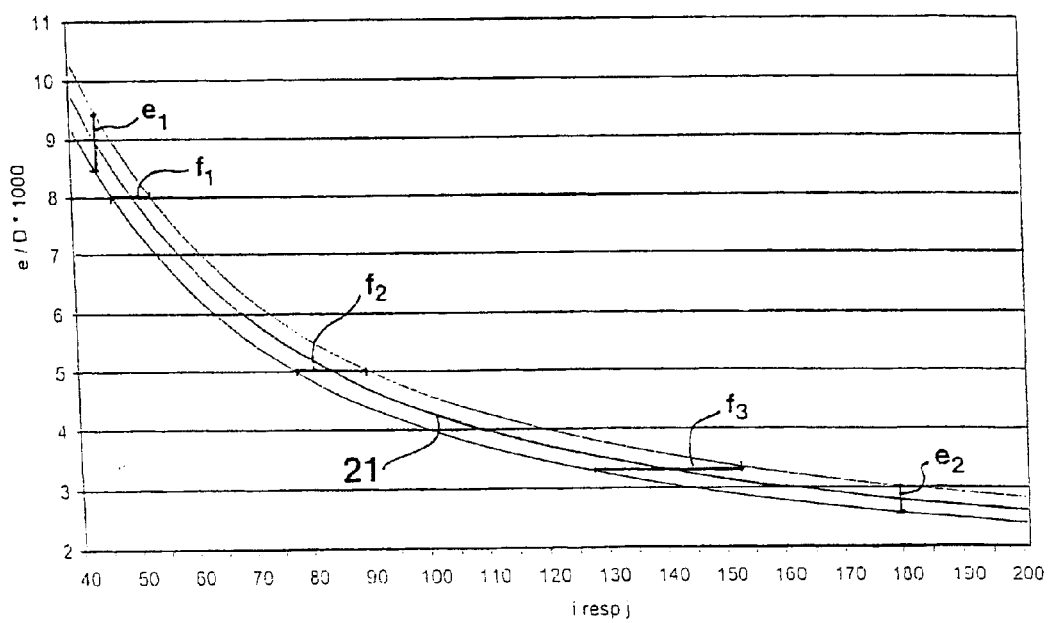
Figure 4:
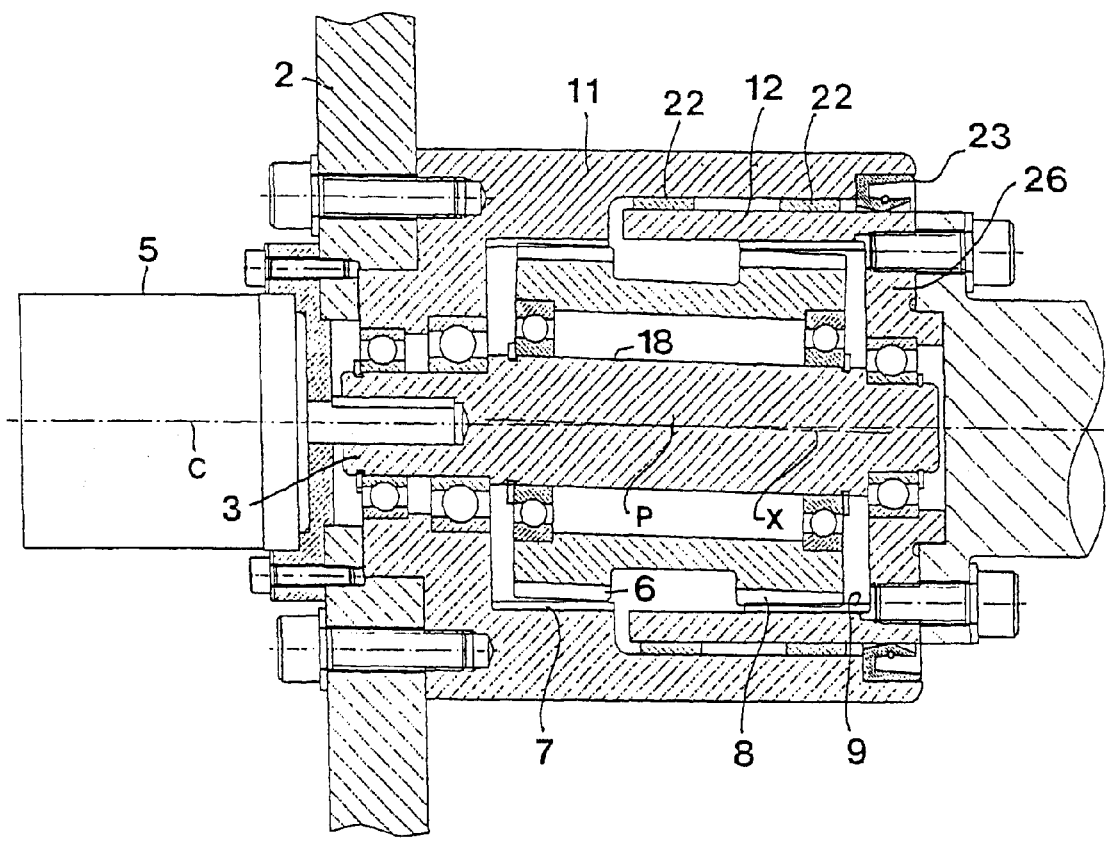
Figure 5:
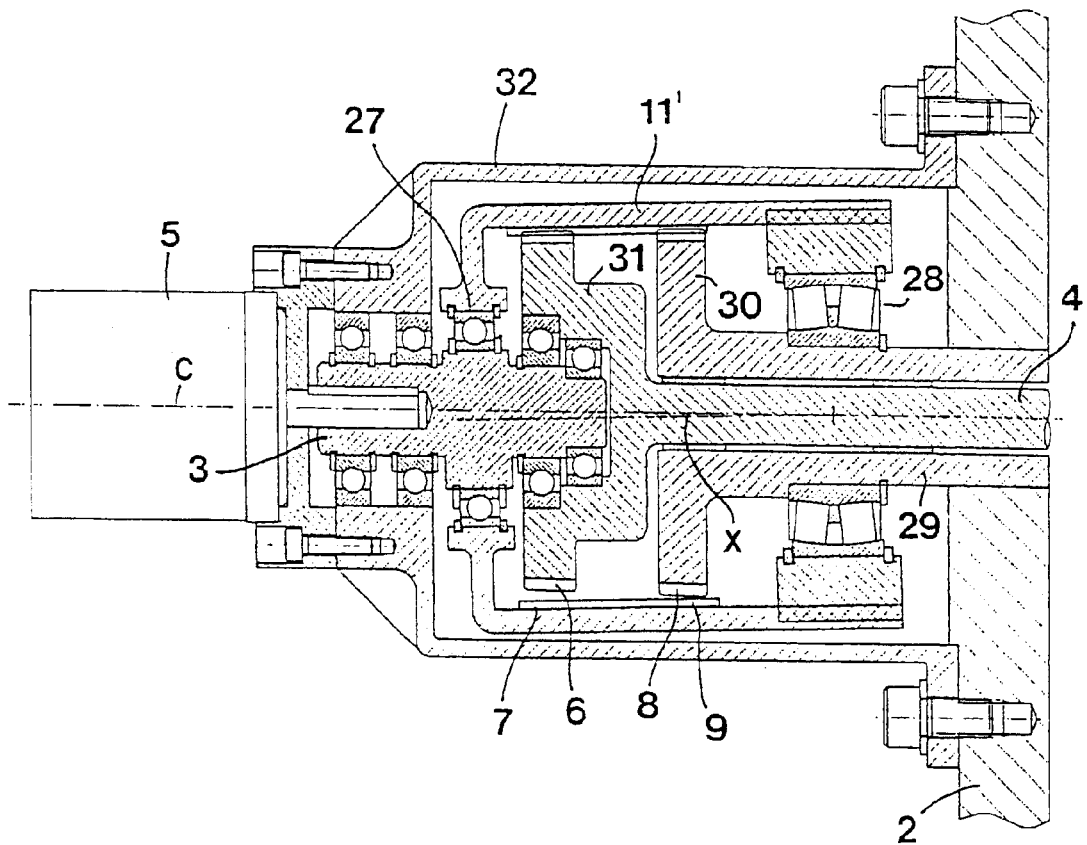

In the drawings:

FIG. 1 is a longitudinal section through a first embodiment of an eccentric gear according to the invention, FIG. 2 is a cross-section A—A in FIG. 1, FIG. 3 is a curve chart, which illustrates suitable eccentricity values of the eccentric gear rims of the gear for different gear changes, FIG. 4 is a longitudinal section showing a second, alternative embodiment of the gear according to the invention, and FIG. 5 is a similar longitudinal section illustrating a third, alternative embodiment.

DETAILED DESCRIPTION OF PREFERRED EMBODIMENTS OF THE INVENTION

In FIG. 1, numeral 1 generally designates an eccentric gear made according to the invention, while numeral 2 designates a reference member in which the eccentric gear is mounted. In the example, the reference member 2 is assumed to consist of a spatially stationary included in a fixed machine stand. It should, however, already now be pointed out that the reference member 2 may in many practical applications also be rotatable. Furthermore, in FIG. 1, the reference numerals 3, 4 designate two rotatable machine elements, which in the example consist of shafts. More precisely, the element 3 consists of a short shaft piece, which is drivable from an external source of power 5, in the example consisting of a motor. However, also external sources of power are possible. In the gear, the shaft 3 constitutes an input or driving shaft, while the second shaft 4 is an output and driven shaft. The two shafts 3, 4 are rotatable around a common geometrical symmetry axis C. At the end (not shown) thereof distanced from the gear 1, the driven shaft 4 is mounted in suitable bearings.

Characteristic of the invention is that the gear 1 includes not only one, but two pairs of co-operating gear rims, viz. a first pair of gear rims 6, 7 situated closest to the reference member 2, and a second pair of gear rims 8, 9 which are axially separated from the first pair of gear rims. In a way characteristic of eccentric gears in general, the first pair of gear rims includes a male-like gear rim 6 having out-turned teeth, as well as a female-like gear rim 7 having in-turned teeth, the male gear rim 6 in the example being eccentric in relation to the symmetry axis C, while the female gear rim 7 is concentric with the symmetry axis C In an analogous way, the second pair of gear rims includes an eccentric male gear rim 8 having out-turned teeth and a concentric female gear rim 9 having in-turned teeth. In both cases, the female gear rim (7 and 9, respectively) has a larger diameter than the appurtenant male gear rim (6 and 8, respectively) to enable engagement of only one or a few of the teeth of the male gear rim in the female gear rim. In a way characteristic of conventional eccentric gears, one of the gear rims in each pair, viz. the male gear rim 6 and 8, respectively, is arranged to roll off against the other one (7 and 9, respectively) during operation.

In the example, the gear rims 6 and 8 are homologous in the sense that they both consist of male gear rims having out-turned teeth at the same time as the gear rims 7 and 9 are homologous in that they both consist of female gear rims having in-turned teeth.

According to the principle of the invention, an individual gear rim in one of the pairs of co-operating gear rims is rigidly connected to a homologous gear rim in the other pair. In the example, the male gear rims 6 and 8 are stiffly inter-connected by being formed on a common sleeve 10, while the female gear rims 7 and 9 are rotatable in relation to each other. The two female gear rims 7, 9 are each formed on the inside of cap parts 11, 12, which together form an outer cap containing the vital parts of the gear. Of these cap parts, the first-mentioned one is rigidly connected to the reference member 2, e.g. via a screw joint 13, while the second one is rigidly connected to the output shaft 4, e.g. via a screw joint 14.

The input shaft 3 is journalled in relation to the two cap parts 11, 12, preferably via ball bearings 15, 16, 17, as is exemplified in FIG. 1.

The two female gear rims 7, 9 are concentric with the symmetry axis C. In order to provide the requisite eccentric motion of the two male gear rims 6, 8, the input shaft 3 is formed with an eccentric body. In the example, this body has the shape of a cylindrical material portion 18 which is integrated with the rest of the shaft and extends eccentrically in relation to the symmetry axis C, more precisely between two shaft end portions which are cylindrical and concentric with the symmetry axis C. A central geometric axis X which is concentric with the envelope surface of the eccentric body 18 extends at a certain, limited angle (e.g. 0,1–1°) to the symmetry axis C. The sleeve 10 with the male gear rims 6, 8 is journalled in relation to the eccentric body 18 by means of bearings 19, 20, e.g. in the shape of ball bearings (see also FIG. 2). The sleeve has a cylindrical basic shape, the male gear rims 6, 8 being concentric with the eccentric axis X. Here, it should be pointed out that the eccentricity of the male gear rims and the sleeve 10 may also be provided by means of spaced-apart, ring-shaped eccentric portions on the shaft 3 instead of by means of the continuous, cylindrical eccentric body 18.

The eccentric axis X extends from a point of inter-section P situated along the symmetry axis C, which point is situated at a certain distance from the male gear rim 8, more precisely thereoutside, and at a larger distance from the male gear rim 6. This means that the eccentricity of the male gear rim 8 in the example is smaller than the eccentricity of the male gear rim 6. It should, however, be emphasized that the eccentric axis X may also be tilted in an opposite way in relation to the one shown in FIG. 1, i.e. with the point P situated in the left part of the input shaft 3, the eccentricity of the male gear rim 8 becoming larger than the eccentricity of the male gear rim 6. In the case shown in FIG. 1, the direction of rotation of the output shaft 4 becomes opposite the direction of rotation of the input shaft 3. In the second case, when the point of intersection p is located in the left part of the in-put shaft, the shafts 3 and 4 will obtain the same direction of rotation, i.e. the shaft 4 becomes co-rotating.

The teeth of the gear rims may advantageously be formed in the manner is described in EP 717 819 (SE 9302907-2), contact points between individual teeth extending helically along the gear rims while guaranteeing an even and silent transmission of power between the teeth. It should also be mentioned that the male gear rims as well as the female gear rims may be given different rotary-symmetrical basic shapes, e.g. a cylindrical basic shape or a conical basic shape.

The Function of the Gear According to the Invention

In the following, the number of teeth in the male gear rims 6, 8 are designated $Z_6$ and $Z_8$, respectively, while the number of teeth of the female gear rims are designated $Z_7$ and $Z_9$, respectively. Furthermore, the eccentricity of the male gear rim 6 in relation to the symmetry axis C is designated $e_1$ and the corresponding eccentricity of the male gear rim 8 is designated $e_2$.

For the sake of simplicity, it is assumed that the reference member 2 is fixed and immovable. If the reference member would consist of a rotary element, it is, however, easy to superimpose the rotation speed of the reference member on other rotation speeds, mentioned below, and reach entirely universal relations.

The engine or source of power 5 gives the shaft 3 a certain rotary speed $\omega_s$. In doing so, the male gear rim 6 is forced to roll off against the female gear rim 7, at the same time as the male gear rim 8 rolls off against the female gear rim 9. In a previously known way (see, for instance, EP 345 276 and EP 717 819) the gear sleeve 10 and the male gear rims 6, 8 thereof obtains a rotary speed $\omega_8$ according to the formula:

$$\omega_8 = -\omega_s/i, \text{ in which } i = Z_6/(Z_7-Z_6) \tag{a}$$

or, after superimposition of a conceived rotary speed $\omega_1$ of the reference member 2, more generally:

$$\omega_8 - \omega_1 = -(\omega_s - \omega_1)/i, \text{ which may be simplified to:}$$

$$\omega_8 = \omega_1*(i+1)/i - \omega_s/i \tag{b}$$

In an analogous way, the following equation is obtained to describe the speed $\omega_9$ of the output shaft:

$$\omega_8 = \omega_s*(j+1)/j - \omega_s/j, \text{ in which } j = Z_8/(Z_9-Z_8) \tag{c}$$

After elimination of $\omega_8$ from the equations (b) and (c), the following relation is obtained:

$$\omega_9 = \omega_1*j*(i+1)/i/(j+1) + \omega_s*(i-j)/i/j \tag{d}$$

By suitable selections of the parameters i and j, i.e. suitable combinations of the number of teeth $Z_6$–$Z_9$, a wide spectrum of different gear changes may be attained. In the chart below, a selection of feasible combinations are given, which are all based on the assumption that $\omega_1=0$, i.e. that the reference member 2 is fixed.

| Example | $z_6$ | $z_7$ | $z_8$ | $z_9$ | i | j | $\omega_s/\omega_9$ |
|---|---|---|---|---|---|---|---|
| 1 | 178 | 179 | 179 | 180 | 178.0 | 179 | −31862 |
| 2 | 177 | 179 | 179 | 180 | 88.5 | 179 | −175 |
| 3 | 176 | 179 | 179 | 180 | 58.7 | 179 | −87.3 |
| 4 | 169 | 170 | 179 | 180 | 169.0 | 179 | −3025 |
| 5 | 168 | 170 | 179 | 180 | 84.0 | 179 | −158 |
| 6 | 167 | 170 | 179 | 180 | 55.7 | 179 | −80.8 |
| 7 | 149 | 150 | 179 | 180 | 149.0 | 179 | −889 |
| 8 | 148 | 150 | 179 | 180 | 74.0 | 179 | −126 |

-continued

| Example | $z_6$ | $z_7$ | $z_8$ | $z_9$ | i | j | $\omega_s/\omega_9$ |
|---------|-------|-------|-------|-------|-------|-------|---------|
| 9  | 147 | 150 | 179 | 180 | 49.0  | 179   | −67.5  |
| 10 | 119 | 120 | 179 | 180 | 119.0 | 179   | −355   |
| 11 | 118 | 120 | 179 | 180 | 59.0  | 179   | −88.0  |
| 12 | 117 | 120 | 179 | 180 | 39.0  | 179   | −49.9  |
| 13 | 89  | 90  | 179 | 180 | 89.0  | 179   | −177   |
| 14 | 88  | 90  | 179 | 180 | 44.0  | 179   | −58.3  |
| 15 | 87  | 90  | 179 | 180 | 29.0  | 179   | −34.6  |
| 16 | 59  | 60  | 107 | 108 | 59.0  | 107   | −131   |
| 17 | 58  | 60  | 107 | 108 | 29.0  | 107   | −39.8  |
| 18 | 57  | 60  | 107 | 108 | 19.0  | 107   | −23.1  |
| 19 | 56  | 60  | 107 | 108 | 14.0  | 107   | −16.1  |
| 20 | 55  | 60  | 107 | 108 | 11.0  | 107   | −12.3  |
| 21 | 54  | 60  | 107 | 108 | 9.0   | 107   | −9.8   |
| 22 | 179 | 180 | 178 | 179 | 179.0 | 178.0 | +31862 |

In the above chart, it may be seen that, without resorting to a considerable large number of teeth in the respective gear rims (may vary between approx. 50 and approx. 180), it is possible to practically freely select gear changes within the range of 10:1 to 32 000:1, more precisely by means of a construction which includes a very small number of components, which in themselves are simple to manufacture; something which ensures a low manufacturing cost.

The examples 1–21 above relates to the embodiments according to FIGS. 1 and 4, where the output shaft 4 is contra-rotating. However, example 22 relates to a conceived embodiment example according to which the output shaft 4 is co-rotating.

When a gear from a chosen parameter combination is to be constructed in detail, the constructor is faced with the problem of generating teeth combinations, which are feasible to combine on one and the same eccentric axis. When a number of teeth parameter combinations according to the chart above are further examined, it turns out that there is an apparent connection between the eccentricity value "e" in relation to the division diameter of the gear rims and the desired gear change ratio. As seen in FIG. 3, it is only possible to synthetize practically useful teeth solutions within a relatively narrow band along an "ideal line" 21 according to the above-mentioned EP 345 276. In FIG. 3, the relative value e/D×1000 is shown along the Y-axis, where D is the diameter of the gear rim, while the values of the gear change i and j, respectively, are shown along the X-axis.

In the preferred embodiment according to FIG. 1, the eccentric body 18 is—as has been pointed out above—not only generally eccentric in relation to the female gear rims 7, 9 which are concentric with the symmetry axis C, but also oblique with the eccentric axis X thereof in relation to the symmetry axis C. In this way, a large degree of freedom to choose different eccentricity values for the co-operating pair of gear rims 6, 7 and 8, 9, respectively, is obtained; something which is expounded further below.

If moderately large gear change ratios are desired, the teeth parameters according to the above chart of examples have to be chosen so that the figures i and j, respectively, are strongly different, e.g. j large and i small, or vice versa. In the example 14 of the chart, a desired gear change of approx. 58:1 is obtained, something which has been provided by choosing i=44 and j=179. According to FIG. 3, the following values are then selected:

$e_1/D_1$ within the range of 0,0085–0,0095, and $e_2/D_2$ within the range of 0,0025–0,0030.

This makes the design of a gear construction having an eccentric axis X which is parallel to the symmetry axis C more difficult, and enforces the relation $D_2 \approx 3 \times D_1$.

In FIG. 3, three experiments $f_1$, $f_2$, $f_3$ to use the same eccentricity at a given diameter D of the two gear rims are illustrated. All these experiments result in gear changes >300:1. In many practical applications for the gear according to the invention, gear changes within the range 40:1–150:1 are, however, desired; something which consequently is not possible to practically realise with an eccentric body, the center axis of which is parallel to the symmetry axis C. A hypothetically feasible way to solve this dilemma would be to let the pair of gear rims with the higher gear change have a considerably smaller diameter than the pair of gear rims with the lower gear change, whereby the two ratios e/D may be approached to each other. In such a conceived embodiment, the two pairs of gear rims have to be made with widely different diameters D so that the ratio e/D becomes approximately equal.

The torque transmission ability of the gear is, in all essentials, determined by the smallest one of the two diameters D in that:

$M_{out}$ is approximately proportional to $D^2 \times L$, where L is the tooth width.

In doing so, the outer dimension of the gear is determined by the largest one of the two D-values. In other words, the possibilities of constructing optimal gears having gear changes smaller than approx. 300:1 are extraordinarily limited if the eccentric axis X would be positioned parallel to the symmetry axis C.

However, if the eccentric body 18 is tilted in the way which is shown in the preferred embodiment according to FIG. 1, large freedom is given to choose gear changes within a wide spectrum and at the same time attain an optimum, compact construction. The gear may then be constructed in the following way:

1) The largest feasible gear rim diameter for the two pairs of gear rims is selected in view of limitations of the outer dimensions as well as suitable solutions to the problem of constructing the bearings of the gear for the application in question.

2) The center axis X of the male gear rims 6, 8 or the sleeve 10 is tilted in relation to the symmetry axis C in such a way that each one of the male gear rims get an ideal eccentricity according to FIG. 3.

3) The tooth width L that is required for the transfer of the maximum torque is determined.

4) The outer edge of each one of the gear rims is located at the borderline for feasible rates of the parameter e/D according to FIG. 3.

5) From these parameters, a suitable length and a suitable angle of inclination of the eccentric body 18 are selected.

If a large gear change is desired, the gear may be formed with pairs of gear rims placed near each other, while small gear changes demand a certain distance between the gear rims. Thus, in the latter case, the gear grows somewhat length-wise, but in spite of this fact the construction becomes more compact and less cost-demanding than other known eccentric gears.

Additional Alternative Embodiments of the Invention

Reference is now made to FIG. 4, which illustrates an alternative embodiment of a gear, the construction of which to a large extent corresponds to the structure of the gear according to FIG. 1. In this case, however, the eccentric body 18 is formed in such a way that the oblique eccentric axis X cuts the symmetry axis C at a point p situated between the two spaced-apart radial planes in which the male gear rims 6, 8 are situated. Advantageously, the point of intersection P may be situated approximately halfway between the two male gear rims.

A certain difference also exists in the design of the external gear cap. In the embodiment according to FIG. 1, the two cap parts 11, 12 are journalled in relation to each other via a bearing 22, e.g. a sliding bearing or cross roller bearing, a seal 23 being arranged in a corner area between a ring-shaped flange 24 and a shoulder surface 25 on the cap part 12.

However, in the embodiment according to FIG. 4, two bearings 22 are arranged between the cap parts 11 and 12, the cap part 11 being formed so that it contains the cap part 12. The sealing 23 is arranged at a free end of the cap part 11 externally of an end wall 26 of the cap part 12.

In FIG. 5, an additional alternative embodiment is visualised, which may be said to be "inverse" in relation to the embodiments of FIGS. 1 and 4. Thus, in this case the two male gear rims 6, 8 are concentric with the symmetry axis C for the two rotatable machine elements or the shafts 3 and 4, while the female gear rims 7, 9 are eccentric in relation to the symmetry axis. More precisely, the female gear rims 7, 9 are formed on the inside of a tubular body 11' which at opposite ends is rotatably journalled via bearings 27, 28. More precisely, one of the ends of the tube body 11' is journalled on the input shaft 3 via the bearing 27, while the opposite end is, via the bearing 28, journalled on the outside of a fixed sleeve 29, which at an inner end has a flange 30 on which the male gear rim 8 is formed. At the inner end thereof, the output shaft 4 has a flange 31 on which the male gear rim 6 is formed. In this case, the two female gear rims 7, 9 may in an advantageous way be integrated with each other in such a way that they constitute portions of a single common gear rim; something which to a large extent facilitates the manufacture. Further-more, the engine 5 is firmly attached to one end of a house 32, the opposite end of which is rigidly connected to the reference member 2, which in turn may be stationary as well as rotary.

In conclusion, it should be pointed out that the difference in the number of teeth on each male gear rim and the number of teeth in each co-operating female gear rim may advantageously amount to 1, although also another difference may exist. Furthermore, at least two homologous gear rims, e.g. the male gear rims 6, 8, in the two pairs of co-operating gear rims, have to have a differently large number of teeth.

Feasible Modifications of the Invention

The invention is not solely restricted to the embodiments described above and shown in the drawings. Although it is preferred to form the gear with the center or rotation axis of the eccentric gear rims oblique in relation to the symmetry axis of the gear, it is thus also feasible within the scope of the invention to locate said center axis parallel to the symmetry axis and with a certain eccentricity in relation thereto. In FIG. 2, it has been exemplified that the teeth of the gear rims may be involute-shaped. However, within the scope of the invention the design of the gear rims and the teeth thereof may be varied within wide limits. For instance, the male gear rims as well as the female gear rims may be cylindrical, but conical in other embodiments, e.g. in the way disclosed in SE 9403348-7 (publication number 503 487). Furthermore, the teeth may be obliquely cut or helical, e.g. in the way disclosed in the above-mentioned EP 717 819. Furthermore, in order to eliminate the risk of teeth play, different possibilities may be used to fine adjust the axial position of the gear rims along the eccentric axis, e.g. by means of washers, such as shim washers or axially resilient washers. Furthermore, it is feasible to use cycloid-shaped teeth or teeth made in another way instead of involute-shaped teeth. Also, the design of the requisite bearings and seals may vary within wide limits depending on the applications and environmental requirements in question. For instance, instead of the bearings 15, 16, 17, 19, sliding bearings, needle bearings or cylindrical - alternatively conical - roller bearings may be used. As bearings 22 between the cap parts, ball bearings, needle bearings, roller bearings or cross roller bearings may be used instead of sliding bearings. In the examples according to FIGS. 1 and 4, the two male gear rims 6 and 8 are stiffly united to each other by being integrated into one and the same machine component, viz. the sleeve 10. However, these two homologous gear rims may also be rigidly connected to each other and at the same time axially adjustable in relation to each other. Thus, these two homologous gear rims may be rigidly connected to each other by being formed on individual sleeve parts, being inter-connected via a splined coupling, which on one hand, guarantees torsional and flexural rigidity between the sleeve parts and thereby the gear rims, but which on the other hand permits axial displacement of the sleeve parts in relation to each other. Such an embodiment is especially suitable for such eccentric gears in which it is desirable to enable fine adjustment of the axial position of the gear rims along the eccentric axis in the way indicated above with the outermost object to minimise the teeth play of the gear.

What is claimed is:

1. Eccentric gear for providing a speed difference between two machine elements (3, 4) which are rotatably mounted in relation to a reference member (2) and individually rotatable around a common geometrical symmetry axis (C), including a first pair of co-operating gear rims (6, 7), one of which is eccentric in relation to the symmetry axis (C) and one of which is in the form of a male-like gear rim (6) formed with out-turned teeth, and the other one is in the form of a female-like gear rim (7) which formed with in-turned teeth and has a larger diameter than the male gear rim (6) in order to enable engagement of only one or a few of the teeth of the male gear rim in the female gear rim, one of the gear rims being arranged to roll against the other one, and a second pair of mutually co-operating gear rims in the form of male and female gear rims (8, 9), one of which is rigidly connected to a homologous gear rim in the first pair of gear rims and situated along a geometric axis (X) being common for these two gear rims, which axis is eccentric in relation to the symmetry axis (C), while the other gear rim in the second pair of gear rims is rotatable in relation to the homologous gear rim thereof in the first pair of gear rims, the number of teeth in the individual male gear rim (6, 8) in each one of the two pairs of gear rims (6, 7; 8, 9) being smaller than the number of teeth in the co-operating female gear rim (7, 9), and wherein the teeth of the first and second pairs of gear rims are involute-shaped, the contact points between individual teeth extending helically along the gear rims.

2. Eccentric gear according to claim 1, characterized in that the eccentric geometry axis (X) is oblique in relation to said symmetry axis (C).

3. Eccentric gear according to claim 2, characterized in that the eccentric geometry axis (X) is oblique in relation to the symmetry axis (C) in such a way that the two machine elements (3,4) rotate in the same direction of rotation.

4. Eccentric gear according to claim 2, characterized in that the eccentric geometry axis (X) cuts the symmetry axis (C) at a point (B) situated between two spaced-apart radial planes in which the rigidly connected gear rims are located.

5. Eccentric gear according to claim 1, characterized in that the two male gear rims (6, 8) are rigidly connected to each other, while the female gear rims (7, 9) are rotatable in relation to each other.

6. Eccentric gear according to claim 1, characterized in that at least two homologous gear rims in the two pairs of co-operating gear rims have a differently large number of teeth.

7. Eccentric gear according to claim 1, characterized in that the difference in the number of teeth on the male gear rim (6, 8) and the number of teeth in the female gear rim (7, 9) amounts to 1 for at least one of the two pairs of teeth (6, 7 ; 8, 9).

8. Eccentric gear according to claim 7, characterized in that said difference in the number of teeth amounts to 1 in both pairs of co-operating gear rims.

9. Eccentric gear according to claim 5, characterized in that the two machine elements consist of shafts (3, 4), one of which (3) is driving and the other one (4) driven, the driving shaft (3) having an eccentric body (18) on which a sleeve (10) is mounted which includes the two male gear rims (5, 8).

10. Eccentric gear according to claim 9, further comprising an external cap which is composed of two cap parts (11, 12) rotatable in relation to each other, one of which (11) is rigidly connected to the reference member (2), while the other (12) one is rigidly connected to the driven shaft (4), at least one bearing (22) acting between the two cap parts (11, 12).

11. Eccentric gear for providing a speed difference between two machine elements (3, 4) which are rotatably mounted in relation to a reference member (2) and individually rotatable around a common geometrical symmetry axis (C), including a first pair of co-operating gear rims (6, 7), one of which is eccentric in relation to the symmetry axis (C) and one of which is in the form of a male-like gear rim (6) formed with out-turned teeth, and the other one is in the form of a female-like gear rim (7) which formed with in-turned teeth and has a larger diameter than the male gear rim (6) in order to enable engagement of only one or a few of the teeth of the male gear rim in the female gear rim, one of the gear rims being arranged to roll against the other one, and a second pair of mutually co-operating gear rims in the form of male and female gear rims (8, 9), one of which is rigidly connected to a homologous gear rim in the first pair of gear rims and situated along a geometric axis (X) being common for these two gear rims, which axis is eccentric in relation to the symmetry axis (C), while the other gear rim in the second pair of gear rims is rotatable in relation to the homologous gear rim thereof in the first pair of gear rims, the number of teeth in the individual male gear rim (6, 8) in each one of the two pairs of gear rims (6, 7; 8, 9) being smaller than the number of teeth in the co-operating female gear rim (7, 9), the eccentric geometry axis (X) being oblique in relation to said symmetry axis (C).

12. Eccentric gear according to claim 11, characterized in that the eccentric geometry axis (X) is oblique in relation to the symmetry axis (C) in such a way that the two machine elements (3,4) rotate in the same direction of rotation.

13. Eccentric gear according to claim 11, characterized in that the eccentric geometry axis (X) cuts the symmetry axis (C) at a point (P) situated between two spaced-apart radial planes in which the rigidly connected gear rims are located.

14. Eccentric gear according to claim 11, characterized in that the two male gear rims (6, 8) are rigidly connected to each other, while the female gear rims (7, 9) are rotatable in relation to each other.

15. Eccentric gear according to claim 11, characterized in that at least two homologous gear rims in the two pairs of co-operating gear rims have a differently large number of teeth.

16. Eccentric gear according to claim 11, characterized in that the difference in the number of teeth on the male gear rim (6, 8) and the number of teeth in the female gear rim (7, 9) amounts to 1 for at least one of the two pairs of teeth (6, 7 ; 8, 9).

17. Eccentric gear according to claim 16, characterized in that said difference in the number of teeth amounts to 1 in both pairs of co-operating gear rims.

18. Eccentric gear according to claim 14, characterized in that the two machine elements consist of shafts (3, 4), one of which (3) is driving and the other one (4) driven, the driving shaft (3) having an eccentric body (18) on which a sleeve (10) is mounted which includes the two male gear rims (5, 8).

19. Eccentric gear for providing a speed difference between two machine elements (3, 4) which are rotatably mounted in relation to a reference member (2) and individually rotatable around a common geometrical symmetry axis (C), including a first pair of co-operating gear rims (6, 7), one of which is eccentric in relation to the symmetry axis (C) and one of which is in the form of a male-like gear rim (6) formed with out-turned teeth, and the other one is in the form of a female-like gear rim (7) which formed with in-turned teeth and has a larger diameter than the male gear rim (6) in order to enable engagement of only one or a few of the teeth of the male gear rim in the female gear rim, one of the gear rims being arranged to roll against the other one, and a second pair of mutually co-operating gear rims in the form of male and female gear rims (8, 9), one of which is rigidly connected to a homologous gear rim in the first pair of gear rims and situated along a geometric axis (X) being common for these two gear rims, which axis is eccentric in relation to the symmetry axis (C), while the other gear rim in the second pair of gear rims is rotatable in relation to the homologous gear rim thereof in the first pair of gear rims, the number of teeth in the individual male gear rim (6, 8) in each one of the two pairs of gear rims (6, 7; 8, 9) being smaller than the number of teeth in the co-operating female gear rim (7, 9), characterized in that:

the two male gear rims (6, 8) are rigidly connected to each other, while the female gear rims (7, 9) are rotatable in relation to each other, and the two machine elements consist of shafts (3, 4), one of which (3) is driving and the other one (4) driven, the driving shaft (3) having an eccentric body (18) on which a sleeve (10) is mounted which includes the two male gear rims (5, 8), and further comprising an external cap which is composed of two cap parts (11, 12) rotatable in relation to each other, one of which (11) is rigidly connected to the reference member (2), while the other (12) one is rigidly connected to the driven shaft (4), at least one bearing (22) acting between the two cap parts (11, 12).

* * * * *